United States Patent [19]

Mainot et al.

[11] 4,156,102
[45] May 22, 1979

[54] METHOD FOR PRODUCING FERRO-ALLOYS

[75] Inventors: Christian Mainot, Noumea; Alain Robert, Elancourt; Imré Tôth, Rambouillet, all of France

[73] Assignee: Societe Metallurgique le Nickel -SLN, Paris, France

[21] Appl. No.: 734,094

[22] Filed: Oct. 20, 1976

[30] Foreign Application Priority Data

Oct. 22, 1975 [FR] France .................... 75 32352

[51] Int. Cl.² .................... F27D 13/00; H05B 7/00
[52] U.S. Cl. .................... 13/2 R; 13/9 ES; 75/11
[58] Field of Search .................... 13/2, 9, 9 ES, 33; 75/11

[56] References Cited

U.S. PATENT DOCUMENTS

| | | | |
|---|---|---|---|
| 1,299,336 | 4/1919 | Hechenbleikner | 13/2 |
| 1,819,239 | 8/1931 | Greene | 75/11 |
| 3,197,539 | 7/1965 | Hinds | 13/2 X |
| 3,224,871 | 12/1965 | Collin | 75/11 |
| 3,459,867 | 8/1969 | Estes | 13/2 UX |
| 3,885,908 | 5/1975 | Nagoya et al. | 13/2 X |
| 3,993,473 | 11/1976 | MacRae | 75/11 |
| 3,997,711 | 12/1976 | Stark et al. | 13/9 R |
| 4,013,401 | 3/1977 | Georgiev et al. | 13/2 R X |

*Primary Examiner*—R. N. Envall, Jr.
*Attorney, Agent, or Firm*—Fleit & Jacobson

[57] ABSTRACT

An improved method and apparatus for producing ferro-alloys from ore in which an ore is first mixed with a solid reducing agent, preheated and pre-reduced in a rotary kiln, and smelted in an electric furnace, in which the pre-reduced ore is heated by a burner provided in the electric furnace where it is also reoxidized. The ore is also heated in the rotary kiln by recycled gas.

16 Claims, 5 Drawing Figures

METHOD FOR PRODUCING FERRO-ALLOYS

The present invention relates to a method for producing ferro-alloys, such as ferro-nickel, more particularly to improving the energy efficiency of a system consisting of the association of an electric kiln and a rotary furnace.

In most conventional units used in producing ferro-alloys, the ore, after a pre-treatment, which depends upon its composition, is mixed with a solid reducing agent such as coal or derivatives thereof, after which it is passed to a rotary kiln where it is dried, heated, and even partially reduced. Upon leaving the rotary kiln, the ore passes to an electric furnace where it is raised to a temperature of the order of 1700° C. and reduced to the condition of a molten alloy, the impurities being removed in the form of slag.

Taken as a whole, these operations consume a considerable amount of energy. This energy, which has a determinative effect upon the cost price of the finished product, may be applied in three forms : electricity, petroleum products, and coal or derivatives thereof. Electrical energy comes from power stations most of which run on petroleum products. Only 25 to 35% of the energy dissipated when these products are burned is recovered in the form of electricity. Heating with electricity therefore consumes three or four times the amount of fuel used in direct heating. This explains why it is always desirable to replace an electrical thermal unit with a thermal unit obtained directly from the combustion of a petroleum product.

In conventional units for producing ferro-alloys, the heat imparted to the ore in the rotary kiln and the electric furnace is derived respectively from the combustion of fuel and from an electrical resistance. Attempts have therefore been made to increase the part played by the fuel in increasing the temperature of the ore emerging from the rotary kiln, as compared with the part played by electrical energy. However, any progress thus obtained is quickly limited by the appearance of sintering rings which are dependant not only upon the temperature of the ore but also upon uniformity of heating, the existence of hot spots being a determining factor in the formation of these rings. Because of these hot spots, there is a limit to the amount of heat that can be applied by burning petroleum products in a rotary kiln, and the existence of this limit indicates that a choice must be made between a high flow of ore in the rotary kiln and a high temperature of ore at the outlet therefrom.

At this stage of the description, another aspect of the problem must be considered, namely that the treatment capacity of the electric furnace is limited solely by the amount of electrical heat that the furnace can deliver to the ore.

It follows from this that any reduction in the consumption of electricity per unit of ferro-alloy produced results in an increase in treatment capacity, always provided that the rotary kiln can meet this increased demand. It is therefore preferable that any improvement in electrical consumption be matched by an increase in the treatment capacity of the rotary kiln. As long as this condition is fulfilled, any saving in energy will produce an increase in the productivity of the plant, and it will also reduce the cost of necessary investment per ton of ferro-alloy produced.

It is for this reason that one of the purposes of the invention is to provide a method for producing ferro-alloys which will result in an improvement in energy efficiency as compared with known installations.

Another purpose of the invention is to provide a method of the type described above which will make it possible to reduce the cost of investment per ton of ferro-alloy produced.

Still another purpose of the present invention is to provide a method whereby the energy efficiency and productivity of existing installations can be improved.

According to the invention, these purposes, and others appearing hereinafter, are achieved by a method for producing ferro-alloys characterized in that a fuel and a gas containing oxygen are introduced into the electric furnace by means of at least one burner located under the arch of the said electric furnace.

The expression "located under the arch" indicates that the outlet from the burner, or burners, is located in the area between the surface of the ore and the arch of the electric furnace, generally in the vicinity of the arch.

It has been demonstrated, during the study upon which this application is based, that the addition of these burners, which may use any suitable fuel, for example powdered coal, fuel gases, or petroleum products, produces a substantial reduction in the consumption of electricity, without in any way disturbing the conduct of the furnace.

The addition of these burners under the arch of the furnace results in a increase in the flow and temperature of the gases or fumes escaping from the furnace. These fumes, the temperature of which may reach 1400° C., carry along some of the ore in the form of fine particles, and the recovery of this ore is essential. A dust-removing installation must therefore be provided, and this installation must be resistant to hot gases. Furthermore, in view of the high temperature of these gases, it is essential to recover the heat they contain, and this may be achieved by passing the hot gases through a heat exchanger before or after the dust has been removed. However, one of the original characteristics of the method according to the invention is that preferance is given to another solution whereby the said fumes are passed directly from the electric furnace to the rotary kiln.

The solution has very many advantages : dust removal occurs automatically within the rotary kiln, and this eliminates the heat losses which inevitably occur in heat exchangers; furthermore, the heat supplied to the rotary furnace is not produced by a burning flame; finally, since the air introduced into the rotary kiln is diluted by the fumes, although it still has an oxidizing effect, it is lower in oxygen, which makes the hot areas of the flame less pronounced. However, the flow of heat in the vicinity of the flame results in the formation of other hot spots, and it is for this reason that, according to a preferred example of embodiment of the invention, the formation of these hot spots is eliminated by distributing the fuel combustion over the length of the tube by means of a modification of the functioning of the main burner in the tube. It is also possible to replace the single burner in the rotary kiln with a plurality of burners arranged, for example, as described in the reference article Metallgesellschaft A.G. Rev.Activ.N.S. N°.12 (1969).

A reduction in the amount of fuel consumed in the rotary kiln may also be obtained by pre-heating the ore in a heat exchanger with the fumes from the said rotary kiln; this reduction in fuel consumption also makes it possible to optimize the length of the flame, and this again saves energy.

The oxygen must be injected under the arch simultaneously with the fuel, in order to ensure complete combustion of the latter. It has been found, surprisingly enough, that it is desirable to inject enough oxygen not only to oxidize the fuel and the gases resulting from reduction of the ore, but also to oxidize the part of the ore reduced in the rotary kiln. This is surprising, since it has hitherto been thought that the larger amount of ore reduced in the rotary kiln, the greater the saving in electrical energy, but the Applicant has shown, and this is one of the most interesting teachings of the present application, that reoxidizing in the electric furnace the part of the ore reduced in the rotary kiln is a still greater source of savings in electricity. However, this reoxidation requires the addition of a larger quantity of solid reductant to the starting material.

This oxygen may obviously be introduced into the electric furnace in any possible manner, but it is more practical to adjust the burner or burners to operate oxidizingly. The oxygen introduced may be in any suitable form, for example pure oxygen, air, or any mixture of air and oxygen.

It should be noted that the equilibria governing the conduct of the electric furnace are dynamic equilibria, and that the quantity of oxygen to be introduced into the furnace is not the quantity stoichiometrically necessary, but is the latter multiplied by a corrective factor which takes into account the oxygen which has not had time to react during its passage through the electric furnace. This corrective factor varies with each installation and its method of operation, but may easily be determined by one skilled in the art.

It may be added that, in order to profit fully from the advantages provided by the method according to the invention, it is desirable to bring the surface of the ore close to the burner flame, and this may be achieved by charging more ore into the electric furnace.

One purpose of the invention is also provision of an industrial apparatus making it possible to put the method described above into continuous operation.

Another purpose of the invention is provision of an apparatus of this type, which can be used not only for the production of ferro-nickel, but also for the production of other ferro-alloys having high melting points, by means of minor modifications.

These purposes are achieved with an installation comprising, in combination, a system consisting of the association of an electric furnace and a rotary kiln, one or more burners located under the arch of the electric furnace, and means for introducing into the rotary kilns the gases or fumes escaping from the electric furnace.

The system consisting of the association of an electric furnace and a rotary kiln may be of any possible type, more particularly of the type mentioned in "The winning of nickel" by J.R. Boldt, pages 400 et seq. (Technical Editor Paul Queneau, 1967).

The means for introducing the fumes into the rotary kiln preferably comprise essentially a conduit, equipped with an air blast-pipe, uniting the electric furnace stack to the rotary kiln, and a system for closing off the stack.

This system may also include means for adjusting the flow of fumes in the said conduit to the pressure obtaining in the electric furnace, a heat exchanger located at the inlet to the rotary kiln, and a device for introducing air and/or oxygen into the electric furnace.

The following description is in no way restrictive, but is intended merely to explain how the teachings of this present application may be put into practice. It should be read in conjunction with the drawings attached hereto, wherein.

Elements common to all five figures bear the same reference numerals and will be described only once.

Figure 1:
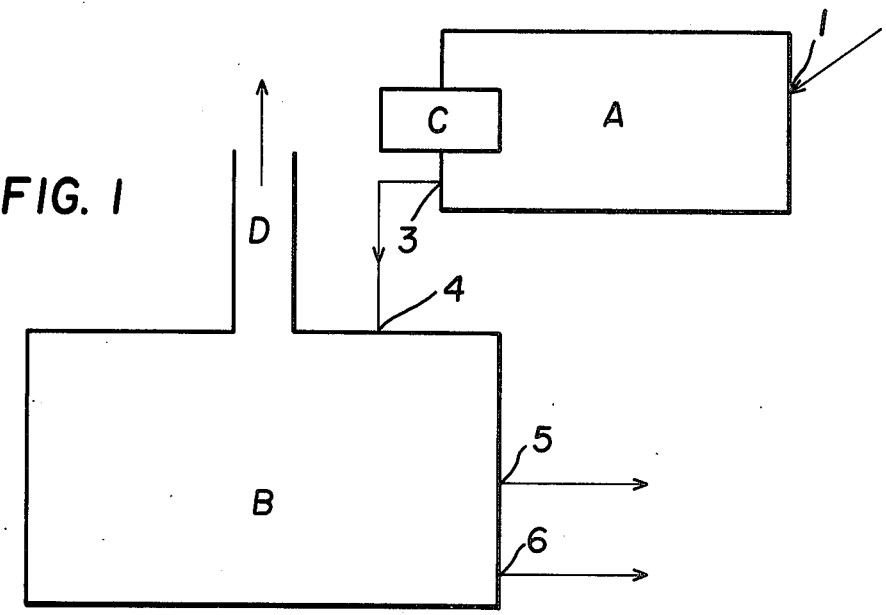
FIG. 1 is a general diagram of existing installations for producing ferro-alloys.

As already indicated, FIG. 1 illustrates, highly diagrammatically, a conventional ferro-alloy producing unit. An installation of this kind comprises essentially a rotary kiln A equipped with a burner C and an electric furnace B equipped with a stack D. The ore to be treated, after the addition of a solid reducing agent, is introduced at 1 into rotary kiln A where it is dried, heated, and partly reduced. The ore thus treated emerges from the rotary kiln at 3 and enters electric furnace B at 4 where it is melted and reduced, any unwanted elements being removed at 5 in the form of slag, and the ferro-alloy being recovered at 6 in the liquid state. The fumes produced in electric furnace B are evacuated through stack D.

Figure 2:
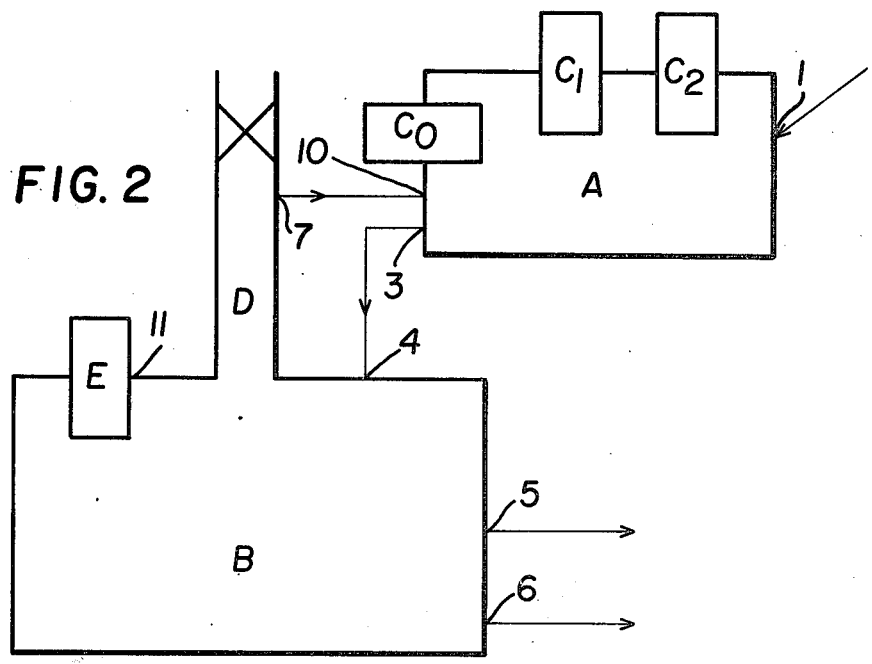
FIG. 2 is a general diagram of a preferred means of executing the method according to the invention.

Referring now to FIG. 2, which is a diagram of the method according to the present invention, it will be noted that burner C in FIG. 1 has been replaced by a plurality of burners, three of which—$C_0, C_1, C_2$—are shown by way of example. Moreover, electric-furnace stack D has been closed off at least partly, the fumes escaping from the said furnace being taken off at 7 and being introduced into the rotary kiln at 10. Finally, electric furnace B is equipped with a burner E, the mouth of which is preferably located under, or close to, the arch of the furnace.

Figure 3:
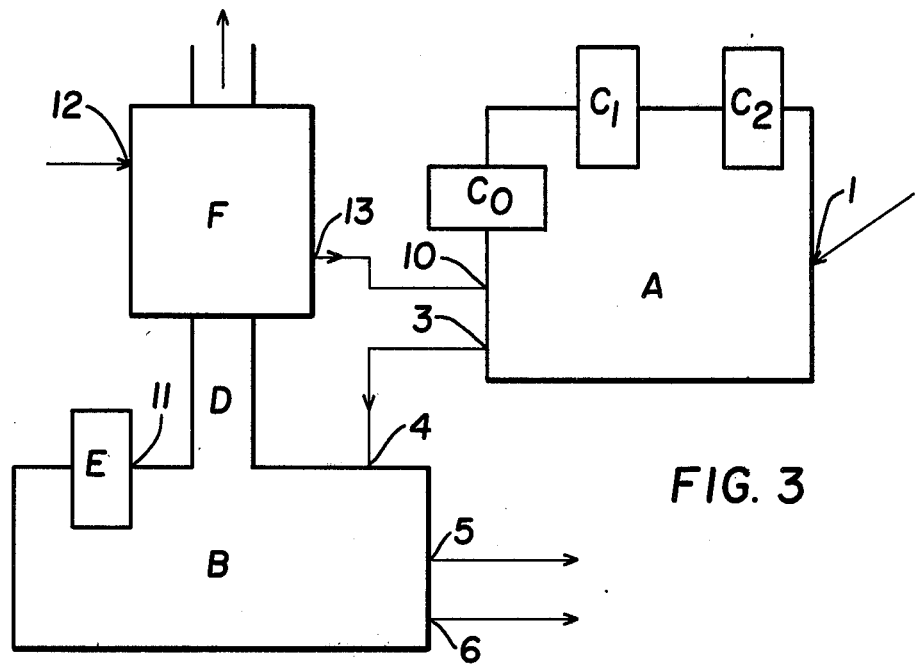
FIGS. 3 and 4 are general diagrams of variants of the method according to the invention.
Figure 4:
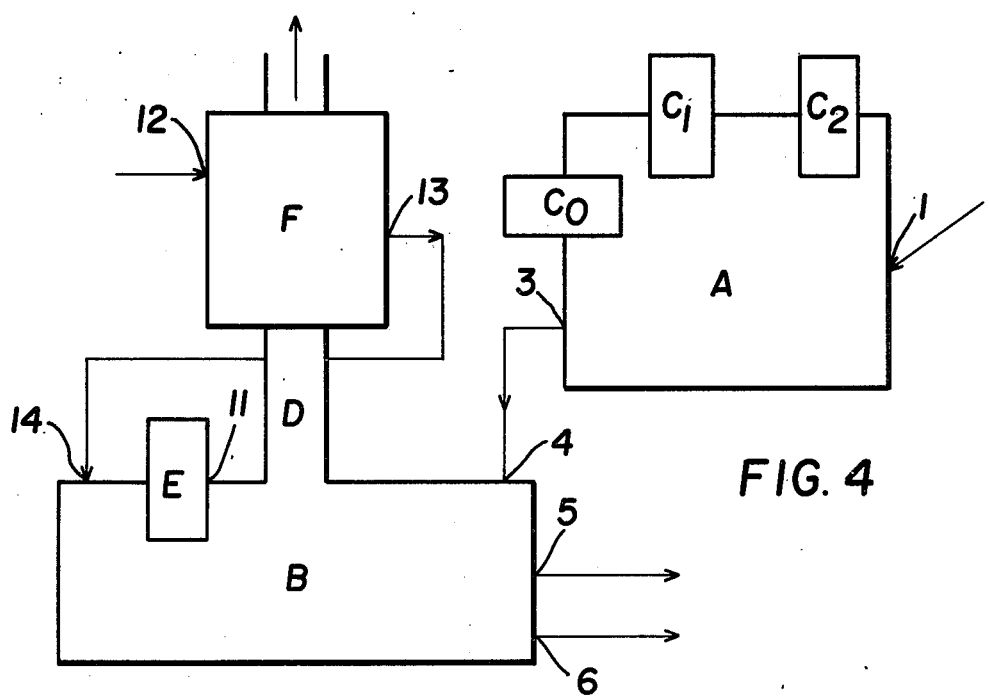

In the variants illustrated in FIGS. 3 and 4, stack D of electric furnace B is equipped with a heat exchanger F through which the fumes produced in the furnace pass. The heat collected from these fumes is transferred to an oxidizing gas which enters heat exchanger F at 12 and leaves it at 13. This oxidizing gas may be air, oxygen, or a mixture of both and, upon leaving the heat exchanger, it flows either to the rotary kiln, which it enters at 10 according to variant 3, or to the electric furnace, which it enters at 14 according to variant 4.

Figure 5:
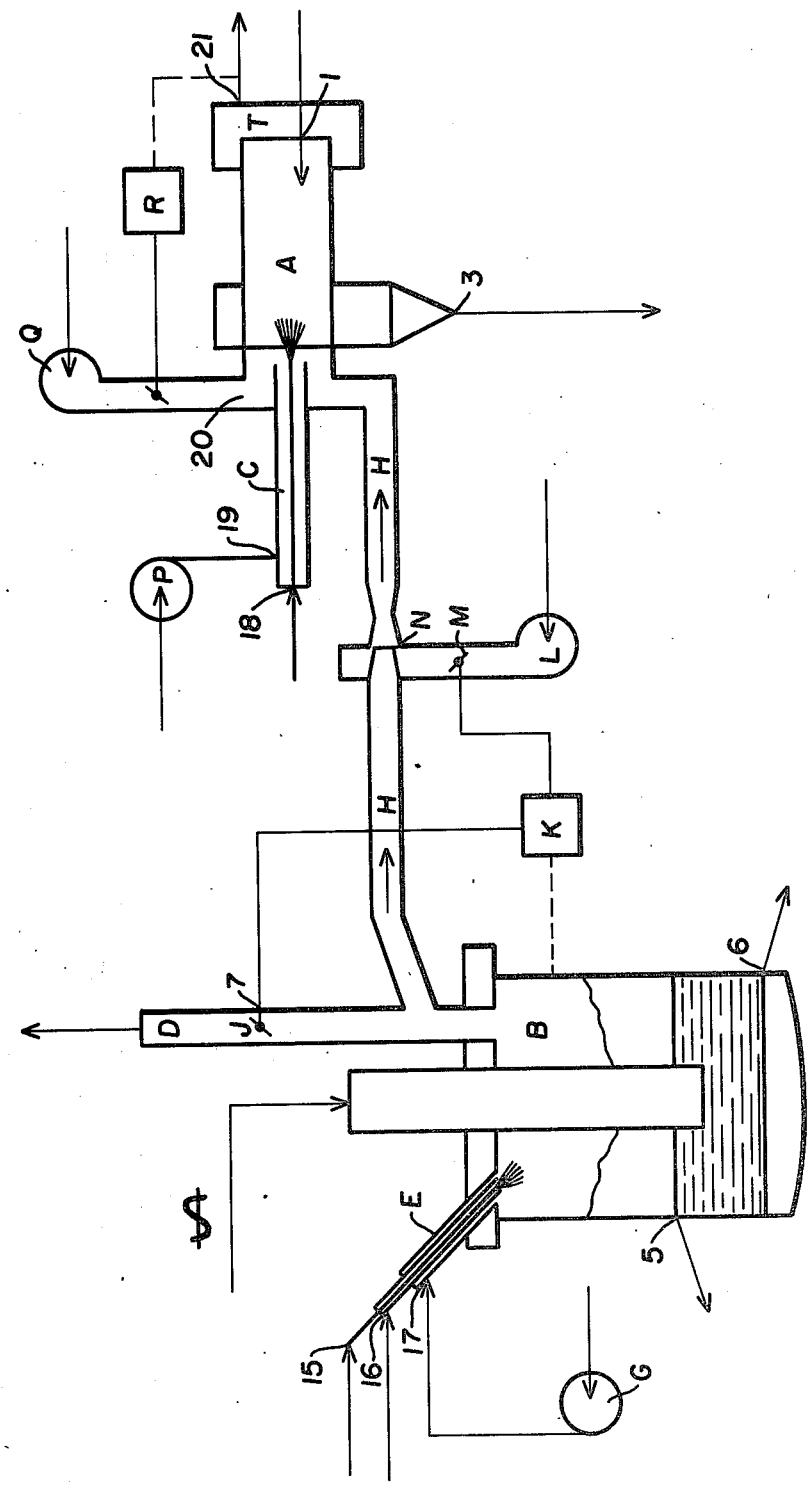
FIG. 5 is a diagrammatic illustration of a device for the execution of one of the preferred embodiments of the invention; in this diagram, only the circuits of the different fluids are shown complete.

FIG. 5 is a more detailed representation of an installation suitable for the execution of the method according to the invention. This again comprises a rotary kiln A, in this case fitted with a single burner C, and an electric furnace B which is equipped with a stack D and with a burner E passing through the arch of the said furnace.

Burner E is supplied with fuel at 15, with primary air at 16, and with secondary air at 17, the said secondary air being supplied by a pump G. Moreover, the fumes produced in the electric furnace flow either to stack D or to rotary furnace A through a conduit H equipped with a blast-pipe N fed by a pump L. The volume of fumes directed to stack D and conduit H is determined by the setting of two dampers J and M, the former being arranged in stack D and the latter between air blast-pipe N and its supply pump L. By means of a regulating system K, the setting of dampers J and M is made dependent upon the pressure obtaining in the interior of electric furnace B.

On the other hand, burner C of rotary kiln A is supplied with fuel at 18, with an oxidizing agent such as air, supplied by a pump P, at 19, and with secondary air from a pump Q at 20. By means of a regulating system R, the flow of secondary air is made dependent upon the oxygen content of the fumes from rotary kiln A, which leave the said kiln at 21 after passing through a heat exchanger T.

The purpose of the following non-restrictive examples is to make it easy for specialists to determine the appropriate operating conditions for each individual case. In these examples, the abbreviation "ts" means tons of ore per second.

EXAMPLE 1

This example relates to a system consisting of the association of an electric kiln and a rotary furnace, in which the method according to the invention is not used. It therefore serves as a means of comparing other examples. This is the rotary-kiln/electric-furnace system illustrated in FIG. 1.

The main operating conditions of, and the main results obtained from, this example are given below:
quantity of ore introduced into the rotary kiln: 30 ts/h
fuel consumed by burner C in rotary furnace A: 60 kg/ts
ore temperature at outlet from rotary kiln (3): 950° C.
volume and temperature of fumes leaving electric furnace: 10,000 Nm$^3$/h at 900° C.
consumption of electric furnace B: 485 kWh/ts.

EXAMPLE 2

This example corresponds to the arrangement illustrated in FIG. 2, but with no oxidation of the pre-reduced ore. The main operating conditions of, and the main results obtained from, this example are given below:
quantity of ore introduced into the rotary kiln: 39 ts/h
fuel consumed by the three burners in the rotary kiln: 47 kg/ts
ore temperature at outlet from rotary kiln (3): 950° C.
fuel consumed by burner E under the electric furnace arch: 10 kg/ts
volume and temperature of fumes leaving electric furnace: 10,000 Nm$^3$/h at 1200° C.
consumption of electric furnace B: 455 kWh/ts.

This shows an increase in the treatment capacity of the rotary kiln with a simultaneous decrease in the consumption of electricity and fuel.

EXAMPLE 3

This example corresponds to the arrangement illustrated in FIG. 3, but with no oxidation of the pre-reduced ore. The main operating conditions of, and the main results from, this example are given below:
quantity of ore introduced into the rotary kiln: 39 ts/h
fuel consumed by the three burners in the rotary kiln: 49 kg/ts
ore temperature at outlet (3) from rotary furnace (A): 950° C.
fuel consumed by burner E under the electric furnace arch: 10 kg/ts
volume and temperature of fumes leaving electric furnace before the heat exchanger: 10,000 Nm$^3$/h at 1200° C.
consumption of electric furnace B: 455 kWh/ts.

In this case, the consumption of fuel in the rotary kiln is slightly higher than in the preceding example.

EXAMPLE 4

This example corresponds to the arrangement illustrated in FIG. 4, but with no oxidation of the pre-reduced ore and without burners $C_1$ and $C_2$.

The main operating conditions of, and the main results obtained from, this example are given below:
quantity of ore introduced into the rotary kiln: 30 ts/h
fuel consumed by burner $C_1$ in the rotary kiln (A): 60 kg/ts
ore temperature at outlet (3) from rotary furnace (A): 950° C.
fuel consumed by burner E under electric furnace arch: 3 kg/ts
volume and temperature of fumes leaving electric furnace: 10,000 Nm$^3$/h at 1200° C.
consumption of electric furnace B: 455 kWh/ts The low fuel consumption of burner E is worthy of note.

EXAMPLE 5

This example corresponds to the arrangement illustrated in FIG. 2, with oxidation of the pre-reduced ore.

The main operating conditions of, and the main results obtained from, this example are given below:
quantity of ore introduced into the rotary kiln: 39 ts/h
fuel consumed by the three burners ($C_0$, $C_1$, $C_2$) in the rotary kiln (A): 47 kg/ts
ore temperature at outlet (3) from rotary furnace (A): 950° C.
fuel consumed by burner E under electric furnace arch: 10 kg/ts
volume and temperature of fumes leaving electric furnace: 10,000 Nm$^3$/h at 1200° C.
consumption of electric kiln B: 435 kWh/ts.

This shows an additional reduction in the consumption of electricity. These examples will make it easier for those skilled in the art to understand what is of interest in the method according to the invention and to select the form of execution thereof best suited to their needs.

We claim:

1. In a method for the production of ferro-alloys from ore wherein the ore is first mixed with a solid reducing agent preheated and prereduced in a rotary kiln and then smelted in an electric furnace having an arch and at least one immersed electrode, the improvement comprising the steps of:
   (a) providing at least one burner located under the arch of the electric furnace;
   (b) introducing a mixture of a fuel and a gas containing oxygen into the burner located under the arch of the electric furnace;
   (c) operating the burner to further preheat the ore; and
   (d) passing the fumes produced in the electric furnace directly into the rotary kiln.

2. A method according to claim 1, wherein the gas is air.

3. The method of claim 1 comprising the additional step of passing fumes produced in the electric furnace directly into the rotary kiln.

4. The method of claim 1 wherein the amount of oxygen contained in said gas containing oxygen is greater than the amount required to oxidize the fuel thus reoxidizing the pre-reduced ore contained in the electric furnace.

5. A method according to claim 4, wherein the oxygen is introduced by operating the burners oxidatively.

6. The method of claim 1 comprising the additional steps of providing a heat exchanger located at the inlet of the rotary kiln and passing the fumes emerging from the rotary kiln through the heat exchanger to preheat the ore.

7. The method of claim 1 comprising the additional steps of providing a heat exchanger located at the outlet of the electric furnace and passing at least a part of the gas containing oxygen and fumes produced by the electric furnace through said heat exchanger to heat said gas.

8. In an apparatus for the production of ferro-alloys from ore wherein the ore is first mixed with a solid reducing agent preheated and prereduced in a rotary kiln and then smelted in an electric furnace having an arch and having an immersed electrode, the improvement comprising at least one burner located under the arch of the electric furnace and means for introducing fumes produced in the electric furnace into the rotary kiln.

9. The apparatus of claim 8 wherein the means for introducing the fumes from the electric furnace into the rotary kiln comprises a stack located at the outlet of the electric furnace, a duct connecting the stack to the rotary kiln, an air blast pipe arranged between the ends of the duct, and a means for closing off the stack.

10. The apparatus of claim 9 further comprising an air pipe located in the duct, damping means located in the stack and in the duct said damping means connected to regulating means, and a heat exchanger located at the inlet to the rotary kiln.

11. The apparatus of claim 10 further comprising an additional regulating means for making the introduction of at least part of oxygen containing gases introduced into the rotary kiln dependent upon the oxygen content of the fumes from the rotary furnace.

12. The method of claim 7 wherein said gas, after having passed through the heat exchanger, passes into the rotary kiln.

13. The method of claim 7 wherein said gas, after having passed through the heat exchanger, passes into the electric furnace.

14. In a method for the production of ferro-alloys from ore, wherein the ore is first mixed with a solid reducing agent preheated and prereduced in a rotary kiln and then smelted in an electric furnace having an arch, the improvement comprising the steps of:
 (a) providing at least one burner located under the arch of the electric furnace;
 (b) introducing a mixture of a fuel and a gas containing oxygen into the burner located under the arch of the electric furnace;
 (c) operating the burner to further preheat the ore; and
 (d) recycling at least part of the fumes produced by the electric furnace into the electric furnace.

15. In a method for the production of ferro-alloys from ore, wherein the ore is first mixed with a solid reducing agent preheated and prereduced in a rotary kiln and then smelted in an electric furnace having an arch, the improvement comprising the steps of:
 (a) providing at least one burner located under the arch of the electric furnace;
 (b) introducing a mixture of a fuel and a gas containing oxygen into the burner located under the arch of the electric furnace so that the amount of oxygen is greater than required to oxidize the fuel, thus reoxidizing the prereduced ore in the electric furnace; and (c) operating the burner to further preheat the ore.

16. The method of claim 1 comprising the additional step of operating the rotary kiln to avoid the appearance of fusion rings.

* * * * *